United States Patent
Ohsie et al.

(10) Patent No.: US 7,254,515 B1
(45) Date of Patent: Aug. 7, 2007

(54) METHOD AND APPARATUS FOR SYSTEM MANAGEMENT USING CODEBOOK CORRELATION WITH SYMPTOM EXCLUSION

(75) Inventors: David Ohsie, Baltimore, MD (US); Salvatore DeSimone, Woodbury, CT (US); Nelson Ferreira, New Rochelle, NY (US); Eyal Yardeni, Ardsley, NY (US)

(73) Assignee: EMC Corporation, Hopkinton, MA (US)

( * ) Notice: Subject to any disclaimer, the term of this patent is extended or adjusted under 35 U.S.C. 154(b) by 9 days.

(21) Appl. No.: 11/336,461

(22) Filed: Jan. 20, 2006

Related U.S. Application Data

(60) Division of application No. 11/176,784, filed on Jul. 7, 2005, now Pat. No. 7,065,467, which is a continuation of application No. 10/814,964, filed on Mar. 31, 2004, now Pat. No. 6,965,845.

(60) Provisional application No. 60/459,072, filed on Mar. 31, 2003.

(51) Int. Cl.
*G06F 15/00* (2006.01)

(52) U.S. Cl. .......................... 702/181; 714/25; 706/50

(58) Field of Classification Search ................ 702/181, 702/182–185, 188, 58, 59; 706/50–52, 19–21; 714/25
See application file for complete search history.

(56) References Cited

U.S. PATENT DOCUMENTS 7,107,185 B1 * 9/2006 Yemini et al. .............. 702/183

\* cited by examiner

*Primary Examiner*—Edward Raymond
(74) *Attorney, Agent, or Firm*—K. Gupta; C. A. Giordano

(57) ABSTRACT

A method and apparatus are provided for correlating events in a system. Problems and other events can, e.g., be detected in a system that generates symptoms or observable events. A computer-accessible codebook is provided that includes a mapping between each of a plurality of groups of possible symptoms and one of a plurality of likely exceptional events (e.g., problems) in the system. The system is monitored and one or more known symptoms generated by the system are detected. A mismatch measure is determined between each of the plurality of groups of possible symptoms in the mapping and the one or more known symptoms using a computer, while disregarding symptoms in the groups of possible symptoms not determined to be known. One or more of the plurality of likely problems is selected corresponding to one of the plurality of groups having the smallest mismatch measure.

7 Claims, 5 Drawing Sheets

FIG. 2

| PROBLEMS/ SYMPTOMS | WEB APPLICATION DOWN | CLIENT 1 CONN. DOWN | CLIENT 2 CONN. DOWN | CLIENT 3 CONN. DOWN | CLIENT 4 CONN. DOWN | CLIENT 5 CONN. DOWN | CLIENT 6 CONN. DOWN |
|---|---|---|---|---|---|---|---|
| CLIENT 1 QUERY FAILED | 1 | 1 | 0 | 0 | 0 | 0 | 0 |
| CLIENT 2 QUERY FAILED | 1 | 0 | 1 | 0 | 0 | 0 | 0 |
| CLIENT 3 QUERY FAILED | 1 | 0 | 0 | 1 | 0 | 0 | 0 |
| CLIENT 4 QUERY FAILED | 1 | 0 | 0 | 0 | 1 | 0 | 0 |
| CLIENT 5 QUERY FAILED | 1 | 0 | 0 | 0 | 0 | 1 | 0 |
| CLIENT 6 QUERY FAILED | 1 | 0 | 0 | 0 | 0 | 0 | 1 |

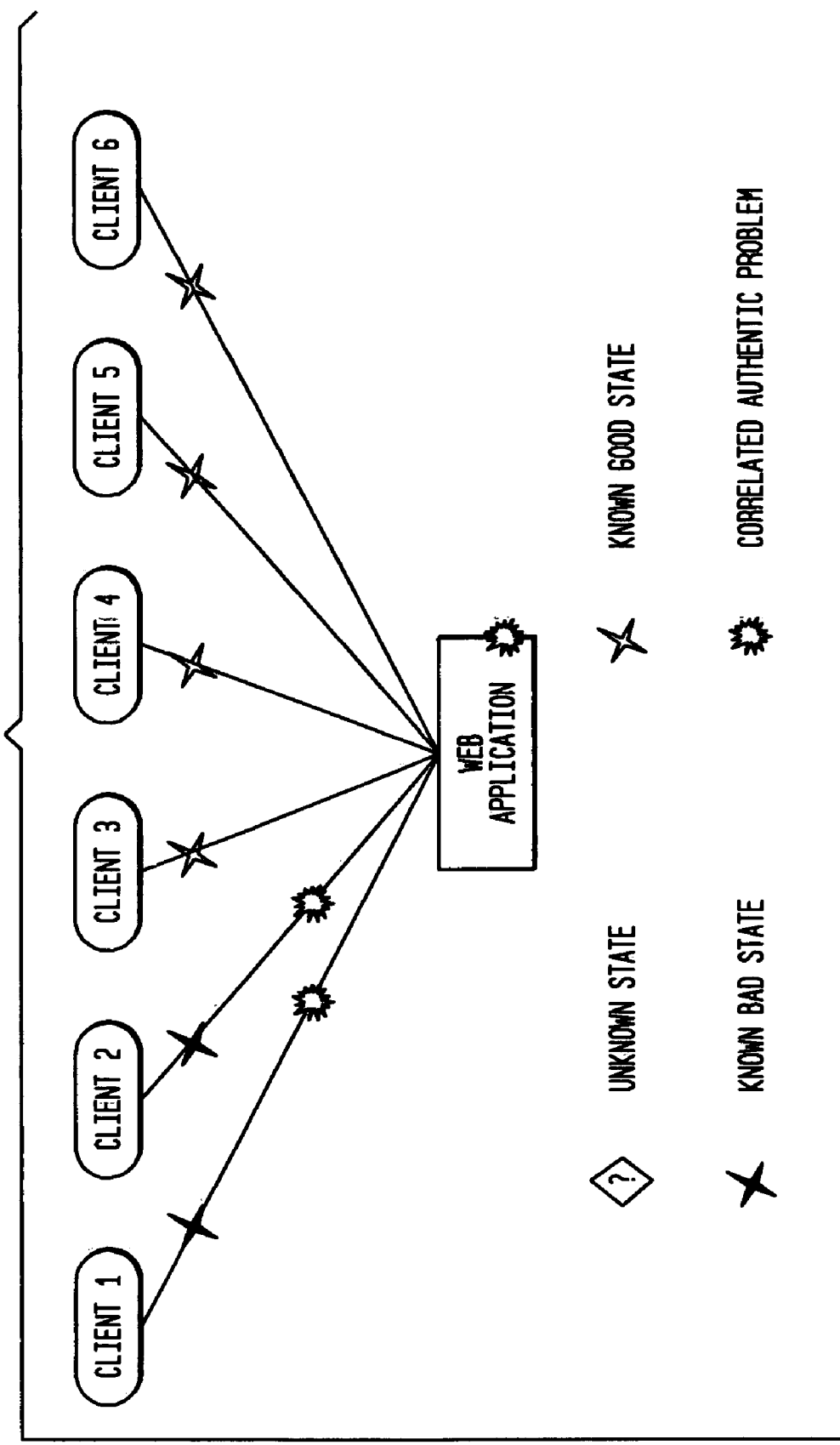

METHOD AND APPARATUS FOR SYSTEM MANAGEMENT USING CODEBOOK CORRELATION WITH SYMPTOM EXCLUSION

RELATED APPLICATION

This application is a division, and claims the benefit of the earlier filing date, of U.S. patent application Ser. No. 11/176,784, entitled "A Method and Apparatus for System Management Using Codebook Correlation With Symptom Exclusion," filed on Jul. 7, 2005, now U.S. Pat. No. 7,065,467, which is a continuation of, and claimed the benefit of the earlier filing date, of U.S. patent application Ser. No. 10/814,964, entitled "A Method and Apparatus for System Management Using Codebook Correlation With Symptom Exclusion," filed on Mar. 31, 2004, now U.S. Pat. No. 6,965,845, which claimed the benefit of the earlier filing date of U.S. Provisional Patent Application Ser. No. 60/459,072 filed on Mar. 31, 2003, the contents of all of which are incorporated by reference herein.

BACKGROUND OF THE INVENTION

1. Field of the Invention

This application relates generally to event correlation in complex systems using codebook correlation techniques to relate events such as, e.g., problems to observable events such as symptoms and, more particularly, to determining root problems or other events using codebook correlation when some observable events are indeterminable or otherwise unknown.

2. Description of Related Art

Codebook correlation is a technique used for identifying the root cause of a problem or other event in a system. Examples of codebook correlation techniques are described in U.S. Pat. Nos. 5,528,516; 5,661,668; and 6,249,755, all issued to Yechiam Yemini et al. (herein refereed to as the "Yemini et al. Patents"), which are incorporated herein by reference in their entirety.

Codebook correlation can be applied to virtually any system generating events. Such systems can include, but are not limited to, enterprise management systems, engineering systems, communications systems, networked information technology (IT) systems, distributed systems, application services, application servers, utility computing systems, autonomic systems, grid computing systems, satellites, business process systems, utility systems, electric power grids, biological systems, medical systems, weather systems, financial market systems, weapons systems, complex vehicles such as spacecraft, medical diagnosis, and financial market analysis.

Briefly, codebook correlation relates events using a data structure such as a mapping, e.g., a table or graph relating particular events represented in a given column with other events represented in a given row. Deterministic or probabilistic approaches can be used. If using a deterministic approach, the intersection of each row and column can be designated, e.g., as "1" if the event causes the other event and "0" otherwise. Alternatively, if using a probabilistic approach, the intersection of each row 'E2' and column 'E1' can be designated 'p', where p is the probability that E1 causes E2.

In one application, codebook correlation can be used to relate a particular event such as problems or other exceptional events to observable events such as symptoms. One can in addition also relate any event exceptional or not to symptoms. In this case, the codebook table can have each row "S" corresponding to a symptom, and each column "P" corresponding to a problem. Using a deterministic approach, the intersection of each row and column can be designated, e.g., as "1" if the problem causes the symptom and "0" otherwise. Alternatively, probabilities can be used where the intersection of each row S and column P can be designated p, where p is the probability that P causes S.

Each column thus created specifies the "signature" of a problem, i.e., it identifies a set of symptoms that a problem causes. An observer of the symptoms of a working system can use the codebook columns to quickly identify the respective problem. Several extensions and variations of these correlation techniques are described in the Yemini et al. Patents, and are incorporated by reference herein.

In some cases, the observed symptoms do not exactly match any of the codebook problem (or other event) signatures. In such cases, the distance between the observed symptoms and the problem signature can be determined to find a sufficiently close match. There are several possible ways of determining the distance. One method in the case of deterministic codebooks (with '1s' and '0s' in each column) is to count the number of mismatches between the signature and the observed symptoms. This number of mismatches defines a so-called Hamming distance between the observed symptoms and the signature. The case where the columns of the codebook have probabilities involves finding the most probable combination of problems that generates symptoms closest to the observed ones. A particular definition of distance between observed symptoms and signatures can be used. For example, see David Alan Ohsie "Modeled Abductive Inference for Event Management and Correlation" (1998) Ph.D Dissertation, Columbia University ("hereinafter the "Ohsie thesis") Section 5.2 provides a definition of such distance and several algorithms (some employing heuristics) that can find how close observed symptoms and signatures are according to the defined distance.

The symptoms generated by a system are usually detected by a subsystem generically referred to herein as instrumentation. Such instrumentation detects and relays events to a management system, and can include, e.g., hardware components and software components (such as agents) associated with elements of the system.

Sometimes the scheme used by the instrumentation to detect symptoms might not poll all possible events in the system. In this case, there is no easy way to know if the symptom happened or if the instrumentation failed to detect it The symptom can thus be said to be in an "unknown" state, i.e., whether the symptom happened or not cannot be assessed. This can lead to an incorrect diagnosis of the root cause problem. Symptoms that are not in "unknown" state are said to be in "known" state.

BRIEF SUMMARY OF EMBODIMENTS OF THE INVENTION

A method and apparatus are provided for correlating events in a system. In accordance with one or more embodiments of the invention, problems and other exceptional events can be detected in a system that generates symptoms or observable events. A computer-accessible codebook is provided that includes a mapping between each of a plurality of groups of possible events (e.g., symptoms) and one of a plurality of likely other events including but not limited to exceptional events (e.g., problems) in the system. The system is monitored and one or more known symptoms generated by the system are detected. A mismatch measure is determined between each of the plurality of groups of possible symptoms in the mapping and said the one or more known symptoms using a computer, while disregarding symptoms in the groups of possible symptoms not determined to be known. One or more of the plurality of likely problems is selected corresponding to one of the plurality of groups having the smallest mismatch measure.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

FIG. 2 is an exemplary table of a codebook illustrating a possible mapping of the problems and symptoms for the system depicted in FIG. 1.

FIG. 6 is a graphical illustration of possible symptoms in the Web application example of FIG. 1 for client-server connection failures.

DETAILED DESCRIPTION OF PREFERRED EMBODIMENTS

The present application is generally directed to codebook correlation techniques that enable accurate correlation for identifying events (such as, e.g., problems) in a system even when there are unknown observable events or symptoms.

Events may be lost because of loss or malfunction in the instrumentation or network. This case of lost events can be distinguished from the case of unknown events. Events can be unknown because, e.g., the instrumentation may not be operating at a given time period to detect events, rather than a failure of the instrumentation itself. For instance, as will be described below, in a network example, the instrumentation might be a query from a client to a server that can be determined to have succeeded or failed. Events may be missing in this case because the client might not be making any queries during a given time period. The Yemini et al. Patents describe processes to handle lost events. Various embodiments of the present invention can handle both lost and unknown events.

The various examples described herein refer primarily to two type of events: (1) observable events, particularly symptoms, and (2) exceptional events, particularly problems. It should be understood, however, that embodiments of the invention can be applied to various types of events not limited to symptoms and problems. For example, exceptional events can include a wide variety of events including normal operation of a system.

Figure 1:
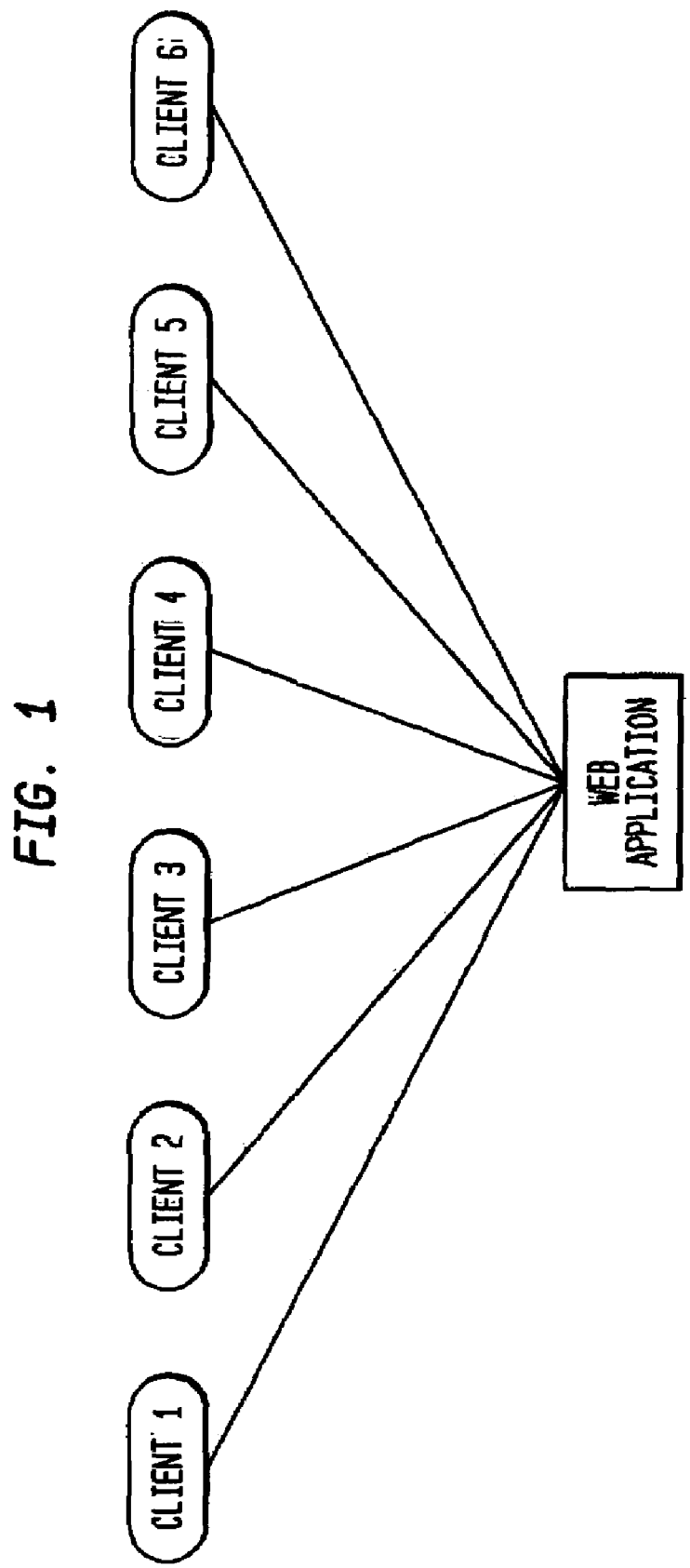
FIG. 1 is a graphical illustration of an exemplary Web-based application with a plurality of clients connected to the Web server.

Referring back to the original codebook scheme described in the Yemini et al. Patents, the presence of each unknown symptom will typically increase the Hamming distance between the problem signature and the observed symptoms. The result may be an inaccurate diagnosis of the problem. For example, FIG. 1 depicts a graphical representation of an exemplary Web-based application with several clients connected to the Web server. The clients may detect a problem in the system when they unsuccessfully try to query the Web server. Each client query thus doubles as instrumentation to detect the symptom "Client query failed."

FIG. 2 depicts a possible way a codebook technique described in the Yemini et al. Patents could represent the problems and symptoms for the system in FIG. 1. Each line in the FIG. 2 table identifies an observable symptom, while each column identifies a possible root problem. For example, a "Client 1 query failed" symptom may be due to a "Web application down" or "Client 1 connection down" problems. On the other hand, the problem "Web application down" has signature (1,1,1,1,1,1), i.e., it is diagnosed when all the observed symptoms occur (queries from all Clients 1-6 fail).

Figure 3:
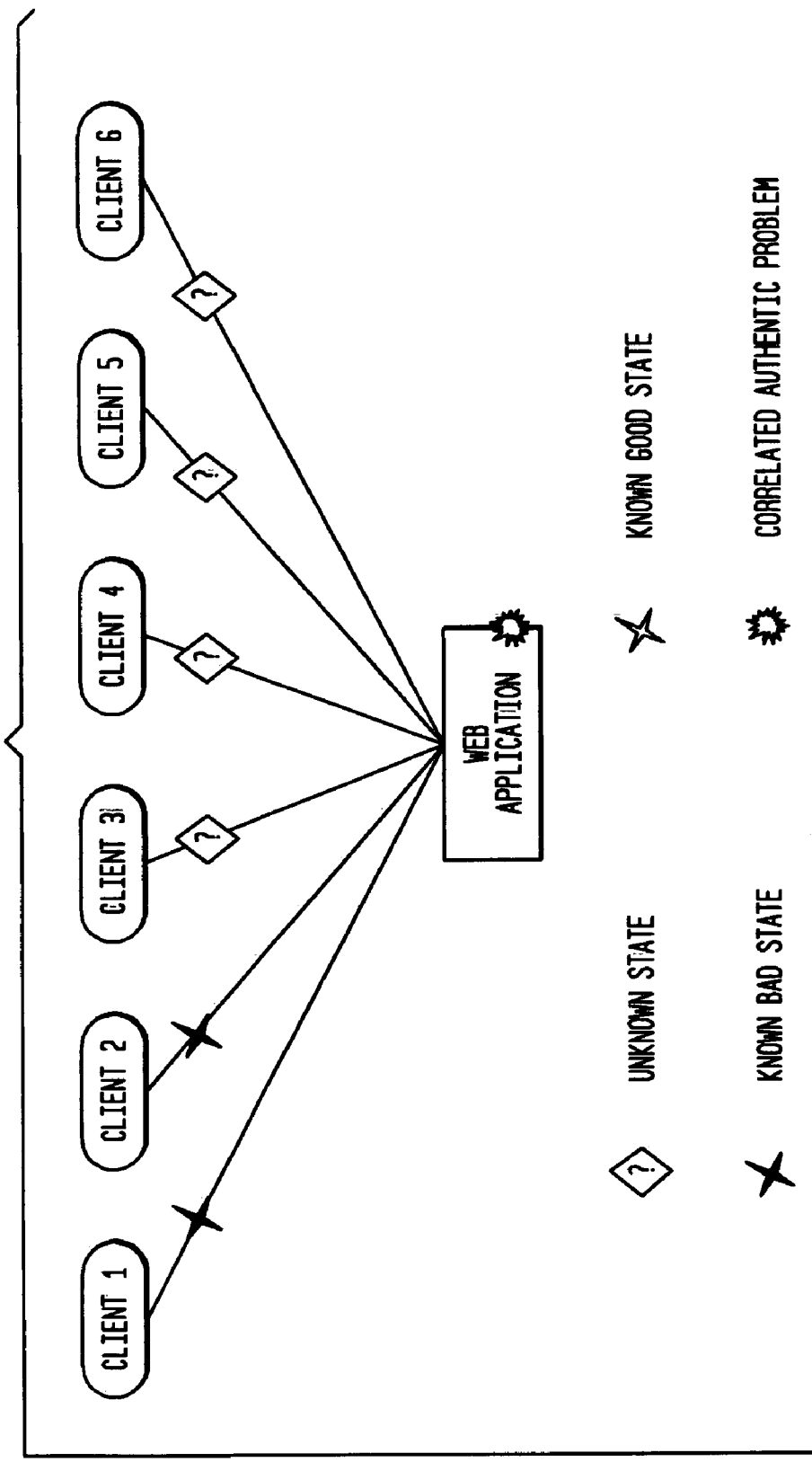
FIG. 3 is a graphical illustration of possible symptoms in the Web application example of FIG. 1 for a Web server failure.

Consider the situation when the Web server crashes, bringing down the Web application. Assume that only Clients 1 and 2 have been accessing the Web server. The symptoms as seen by the system are depicted in FIG. 3. Using the codebook in FIG. 2, since four of the symptoms are missing, the distance between the observed symptoms and the signature of the problem is four. Meanwhile, the distance between the signature and the combined problem of both, a connection failure between Client 1 and the Web server, and Client 2 and the Web server, is only zero. The system will accordingly incorrectly diagnose the root causes problem as a failure in both connections: the one between Client 1 and the Web server, and the one between Client 2 and the Web server.

The error in the diagnosis occurred because some of the symptoms did not manifest simply because the clients were not accessing the Web server. That is, the codebook correlation scheme in this case relied on the assumption that the instrumentation is accurate, i.e., clients are constantly accessing the server. Since the assumption did not hold, the codebook correlation scheme concluded incorrectly that the client connections were working, when in fact they were in an unknown state. In truth, the connections between Clients 3-6 and the Web server could not have worked since the server was down.

Techniques in accordance with one or more embodiments of the invention can correctly identify the root problem, even when some of the symptoms are unknown.

Figure 4:
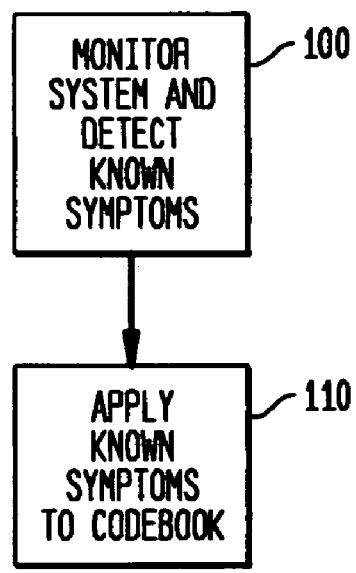
FIG. 4 is a flow chart illustrating a method for codebook correlation in accordance with one or more embodiments of the invention.

A method of codebook correlation in accordance with one or more embodiments of the invention is generally described with reference to FIG. 4. A model of the system being analyzed and a corresponding codebook are provided.

At step 100, the system is monitored for symptoms, and one or more symptoms are detected, e.g., an event indicating that the symptom is being monitoring is detected. These symptoms are detected and accordingly designated as known symptoms. Symptoms that are indeterminate, i.e., unknown, are disregarded. For example, in the FIG. 3 Web server/client example, the symptoms for Clients 3-6 would not be detected since Clients 3-6 are not accessing the Web server, and the symptom indicating the existence of communication between Clients 3-6 and the Web server are accordingly designated unknown.

At step 110, the known symptoms are applied to the codebook, while disregarding entries in the codebook related to the unknown symptoms. As unknown symptoms are excluded from the problem signature, the method will more accurately diagnose the problem.

Figure 5:
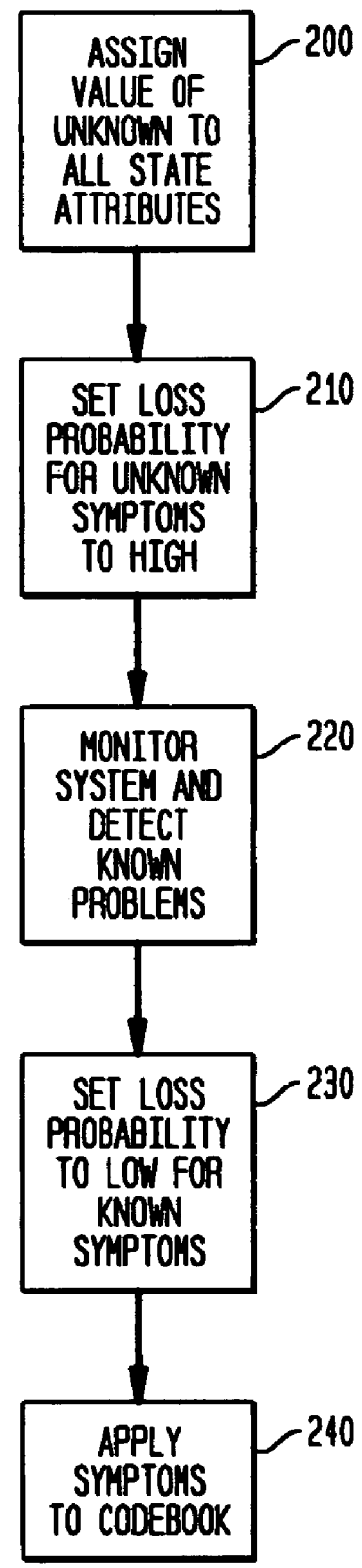
FIG. 5 is a flow chart illustrating a method for codebook correlation in accordance with one or more further embodiments of the invention.

An alternate method of codebook correlation in accordance with one or more further embodiments of the invention is generally described with reference to FIG. 5. A model of the system being analyzed and a corresponding codebook are provided. All symptoms in the system codebook model have an associated state attribute.

At step 200, assign an initial value of unknown to all state attributes, i.e., states associated with a symptom.

At step 210, set the loss probability for a symptom to a high value, e.g., to a value near or equal to 100%, when the value of its state attribute is unknown.

At step 220, the system is monitored for symptoms, one or more symptoms are detected, e.g., an event indicating that the symptom is being monitoring is detected. These symptoms are detected and accordingly designated as known symptoms.

At step 230, the loss probability is reduced for a symptom once an event indicating that the symptom is being monitoring is detected and the attribute is set to a value other than unknown. The loss probability can be reduced to a low value, e.g., near or at 0%.

At step 240, the symptoms are applied to the codebook taking into account their respective loss probabilities. This can be done, e.g., as follows: Let the loss probability set for symptom S according to the previous steps be x. For each cell in the codebook relating a problem P with a symptom S with probability p, the new probability in the cell will become p×(1−x). Note that for the case when the unknown symptom has loss probability x=1, the cell will have 0. Several ways the codebook correlation technique can work with a probabilistic codebook are described in the Ohsie Thesis, Chapter 5, especially starting at Section 5.2. As unknown symptoms are generally excluded from the problem signature, the method will more accurately diagnose the problem.

Note that the probability p of a problem P generating symptom S may have been generated taking into account loss probability of S being observed or not. It may also take into account the probability of S being a spurious symptom. The Ohsie thesis, particularly in Chapter 5, describes how these probabilities can be taken into account to define the final probability in the codebook cell.

In accordance with one or more further embodiments of the invention, the codebook may be "self-tuning" based on the event activity. When events such as the client-Web server queries in FIG. 3 for Clients 3-6 do not happen, their corresponding symptoms are excluded from the affected problem signatures. However, if events do later occur, the corresponding symptoms can then be restored in the problem signatures.

In accordance with one or more further embodiments of the invention, a window of time can be specified over which symptoms each have a known associated state with some probability. Periodically, at the end of the window, all probabilities can be adjusted by increasing their uncertainty, i.e., the loss probabilities for all symptoms can be raised to a high value, e.g., to a value near or equal to 100%. This process can be used to adjust for any errors in the detection of symptoms.

For instance, in the FIG. 3 example, an error in the system may create a spurious query between Client 4 and the Web server, which may result in an observed symptom. The window of time embodiment will eventually lower the importance of such spurious event by decreasing the probability of knowledge of the observed symptom.

The following are non-limiting examples of applications of codebook correlation in accordance with one or more embodiments of the invention.

Web Application Failure

Referring to FIG. 3, the unknown symptoms coming from Clients 3-6 would be removed or disregarded from the codebook signatures in FIG. 2. In this case, the root cause is correctly detected as the Web application failure because the distance between the observed symptoms and the signature in the adjusted codebook is 0. Note that the distance between the observed signature and the one in the adjusted codebook for the other candidate problems is at least 1.

Client-Server Connection Failure

The example in FIG. 6 depicts clients accessing a Web server, similar to the example of FIG. 3. However, in the FIG. 6 example, the two transactions for the Clients 1 and 2 are non-responsive, while the other Clients 3-6 provide the correct response.

Since there are no unknown states in this case, the problem signature for Web server down will not match the available symptoms. The system will correctly identify the root problem as the connections to clients 1 and 2 as being down.

While the examples and applications described above generally relate to networks, it should be understood that various embodiments of the invention can be broadly applied to a wide variety of systems including, but not limited to, enterprise management systems, engineering systems, communications systems, networked information technology (IT) systems, distributed systems, application services, application servers, utility computing systems, autonomic systems, grid computing systems, satellites, business process systems, utility systems, electric power grids, biological systems, medical systems, weather systems, financial market systems, weapons systems, complex vehicles such as spacecraft, medical diagnosis, and financial market analysis.

These codebook correlation method steps described herein are preferably implemented in one or more general purpose or other computers. A representative computer is a personal computer or workstation platform that is, e.g., Intel Pentium®, PowerPC® or RISC based, and includes an operating system such as Windows®, OS/2®, Unix or the like. As is well known, such machines include a display interface (a graphical user interface or "GUI") and associated input devices (e.g., a keyboard or mouse).

The codebook correlation method is preferably implemented in software, and accordingly one of the preferred implementations of the invention is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Any numbered steps in the appended method claims should not be considered as limiting the particular order in which the claimed steps are practiced.

The invention claimed is:

1. A method for detecting problems in a system that generates a plurality of symptoms, the method comprising the steps of: (a) providing a matrix of values, each value corresponding to an element in a mapping between one of a plurality of symptoms and one of a plurality of likely events in said system, wherein selected ones of the symptoms are in a known state; (b) associating a high loss probability with symptoms not in a known state; (c) receiving a plurality of symptom generated by said system; (d) decreasing the loss probability of symptoms that have been received; (e) determining a mismatch measure between each of a plurality of groups of said values in said codebook and said plurality of known symptom data values, said mismatch measure taking into account the loss probability of symptoms; (f) selecting one of said plurality of likely events corresponding to one of said plurality of groups having the smallest mismatch measure; and wherein the said plurality of likely events are stored in a memory.

2. A apparatus for detecting events in a system, the apparatus comprising: a processor in communication with a memory storage device, said processor executing code for accessing a mapping between each of a plurality of groups of possible observable events and one of a plurality of likely corresponding events in said system wherein selected ones of the observable events are determined to be in known state; detecting one or more observable events generated by said system and determining the detected observable events to be in a known state; determining a mismatch measure between each of the plurality of groups of possible observable events in said mapping and said one or more observable events determined to be in a known state; selecting one or more of said plurality of likely events corresponding to one of said plurality of groups having the smallest mismatch measure; and wherein the said plurality of likely events are stored in a memory.

3. The apparatus of claim 2 wherein said mismatch measure comprises a Hamming distance.

4. A computer-readable medium containing code for instructing a processor to determine at least one likely event in a system that generates at least one of a plurality of symptoms, the code instructing the processor to execute the steps of: (a) accessing a matrix of values, each value corresponding to an element in mapping between one of a plurality of symptoms and one of a plurality of likely events in said system, wherein each of the values represents whether the symptom is determined to be in a known state or not determined to be in a known state; (b) monitoring generation of a plurality of symptoms; (c) adjusting the value of corresponding symptoms that have been generated; and wherein the said plurality of likely events are stored in a memory.

5. The computer-readable medium as recited in claim 4, wherein the value associated with symptoms not determined to be in a known state is higher than the value associated with symptoms determined to be in a known state.

6. The computer-readable medium as recited in claim 4, wherein the code further providing instruction to the processor to execute the step of adjusting the value by decrementing said value.

7. The computer-readable medium as recited in claim 4, wherein the code further providing instruction to the processor for executing the steps of:

determining a mismatch measure between each of a plurality of groups of said values in said matrix and said plurality of symptom data values, said mismatch measure taking into account the value associated with the symptoms; and selecting one of said plurality of likely events corresponding to one of said plurality of groups having the smallest mismatch measure.

* * * * *